United States Patent
Plemmons

(10) Patent No.: US 11,549,485 B1
(45) Date of Patent: Jan. 10, 2023

(54) WINDMILL

(71) Applicant: Clay Plemmons, Candler, NC (US)

(72) Inventor: Clay Plemmons, Candler, NC (US)

(*) Notice: Subject to any disclaimer, the term of this patent is extended or adjusted under 35 U.S.C. 154(b) by 0 days.

(21) Appl. No.: 17/307,311

(22) Filed: May 4, 2021

(51) Int. Cl.
*F03D 3/06* (2006.01)
*F03D 3/00* (2006.01)

(52) U.S. Cl.
CPC ............ *F03D 3/067* (2013.01); *F03D 3/005* (2013.01); *F05B 2240/3052* (2020.08); *F05B 2260/72* (2013.01)

(58) Field of Classification Search
None
See application file for complete search history.

(56) References Cited

U.S. PATENT DOCUMENTS

| | | | | |
|---|---|---|---|---|
| 4,474,529 A | * | 10/1984 | Kinsey | F03D 3/0472 415/4.4 |
| 4,545,729 A | * | 10/1985 | Storm | F03D 3/005 416/142 |
| 4,679,985 A | | 7/1987 | Worms | |
| 5,051,059 A | | 9/1991 | Rademacher | |
| 5,375,968 A | * | 12/1994 | Kollitz | F03D 80/70 415/4.2 |
| 8,035,245 B1 | | 10/2011 | Simnacher | |
| 8,491,262 B2 | | 7/2013 | McGrath | |
| 9,677,539 B2 | * | 6/2017 | Tamatsu | F03D 3/067 |
| 2003/0209911 A1 | * | 11/2003 | Pechler | F03D 3/02 290/55 |
| 2009/0185905 A1 | * | 7/2009 | Farb | H02N 2/18 416/131 |
| 2010/0092290 A1 | * | 4/2010 | Aaron | F03D 3/005 416/61 |
| 2010/0276943 A1 | * | 11/2010 | Tianchon | H02K 53/00 74/DIG. 9 |
| 2011/0103950 A1 | | 5/2011 | Pesetsky | |
| 2011/0194938 A1 | * | 8/2011 | Livingston | B63H 9/00 416/132 B |
| 2012/0047976 A1 | * | 3/2012 | Vanderhye | B01D 53/78 71/61 |
| 2012/0124985 A1 | * | 5/2012 | Lei | F03D 3/005 60/398 |
| 2012/0301301 A1 | * | 11/2012 | Sauer | F03D 3/065 416/170 R |
| 2012/0306215 A1 | * | 12/2012 | Wesby | F03D 7/022 290/55 |
| 2013/0136600 A1 | * | 5/2013 | Tamatsu | F03B 17/065 416/119 |

(Continued)

*Primary Examiner* — Michael Lebentritt
(74) *Attorney, Agent, or Firm* — Kyle A. Fletcher, Esq.

(57) ABSTRACT

The windmill converts the kinetic energy of a flowing fluid into rotational energy that can be used to power a mechanical load. The turbine incorporates a plurality of plate structures, a plurality of sail/wing structures, and a drive shaft. The plurality of plate structures attach to the plurality of sail/wing structures such that the passage of the flowing fluid through the plurality of sail/wing structures rotates the combined structure. The combined structure formed by the plurality of plate structures and the plurality of sail/wing structures rotates around an axis of rotation. The drive shaft attaches to the combined structure formed by the plurality of plate structures and the plurality of sail/wing structures such that the rotation of the combined structure rotates the drive shaft.

18 Claims, 5 Drawing Sheets

(56) References Cited

U.S. PATENT DOCUMENTS

| | | | |
|---|---|---|---|
| 2013/0270824 A1* | 10/2013 | Farley | F03D 9/25 290/44 |
| 2014/0356163 A1* | 12/2014 | Schwaiger | F03D 7/06 416/1 |
| 2016/0281507 A1 | 9/2016 | Henry | |
| 2017/0130695 A1* | 5/2017 | Agtuca | G09F 19/02 |
| 2017/0248118 A1* | 8/2017 | Ivers | F03D 1/0625 |
| 2018/0080433 A1* | 3/2018 | Te | G09F 11/025 |
| 2018/0135594 A1* | 5/2018 | Mastel | F03D 5/00 |
| 2018/0156193 A1* | 6/2018 | Hench | F03D 3/062 |
| 2021/0199091 A1* | 7/2021 | Hopkins | F03D 3/0409 |

* cited by examiner

WINDMILL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to a wind motor with a rotation axis substantially perpendicular to the air flow entering the rotor. (F03D3/00)

SUMMARY OF INVENTION

The windmill is a mechanical device. The turbine converts the kinetic energy of a flowing fluid into rotational energy that can be used to power a mechanical load. The turbine comprises a plurality of plate structures, a plurality of sail/wing structures, and a drive shaft. The plurality of plate structures attach to the plurality of sail/wing structures such that the passage of the flowing fluid through the plurality of sail/wing structures rotates the combined structure. The combined structure formed by the plurality of plate structures and the plurality of sail/wing structures rotates around an axis of rotation. The drive shaft attaches to the combined structure formed by the plurality of plate structures and the plurality of sail/wing structures such that the rotation of the combined structure rotates the drive shaft.

These together with additional objects, features and advantages of the turbine will be readily apparent to those of ordinary skill in the art upon reading the following detailed description of the presently preferred, but nonetheless illustrative, embodiments when taken in conjunction with the accompanying drawings.

In this respect, before explaining the current embodiments of the turbine in detail, it is to be understood that the turbine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the turbine.

It is therefore important that the claims be regarded as including such equivalent construction insofar as they do not depart from the spirit and scope of the turbine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
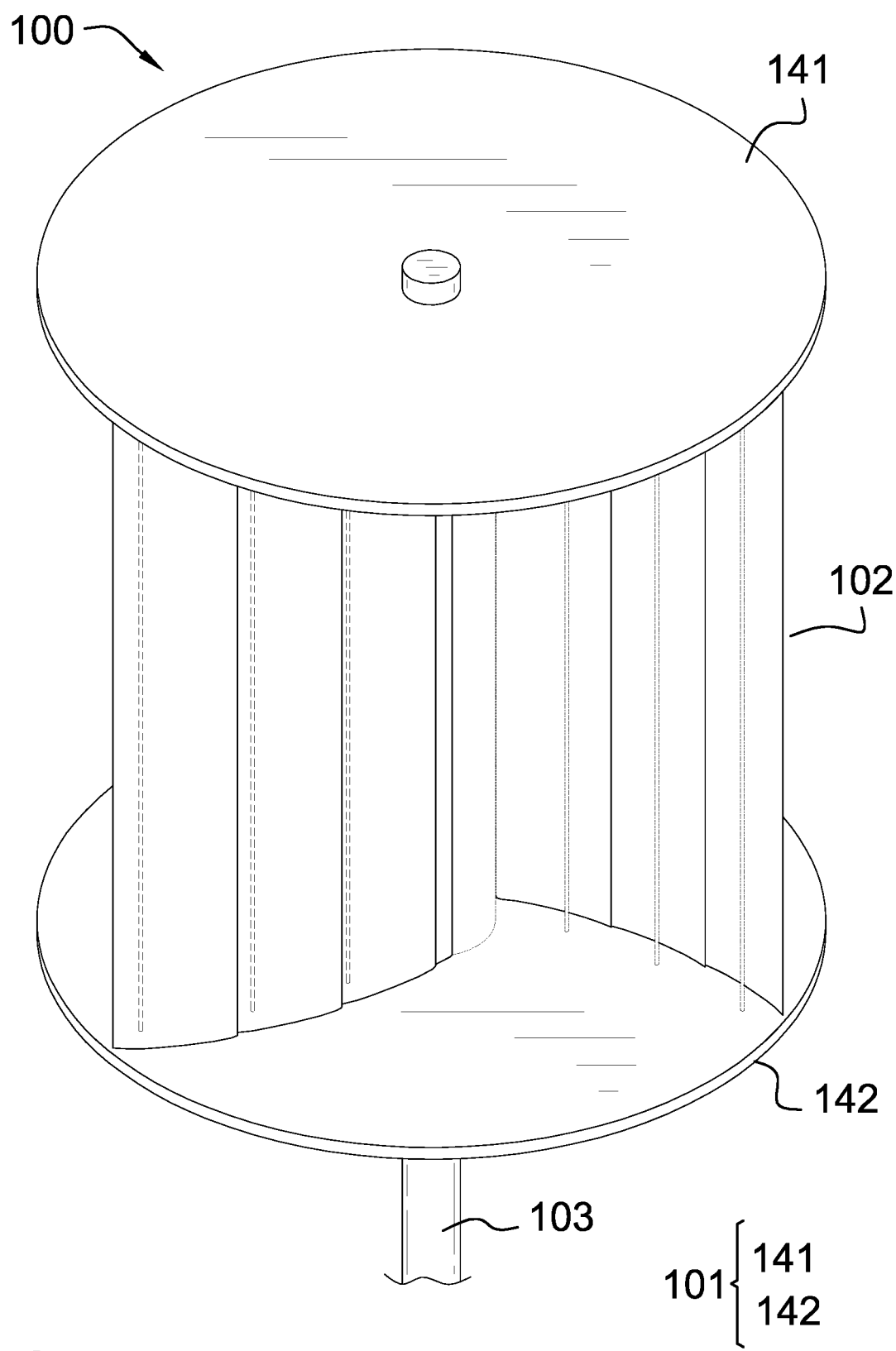
FIG. 1 is a perspective view of an embodiment of the disclosure.
Figure 2:
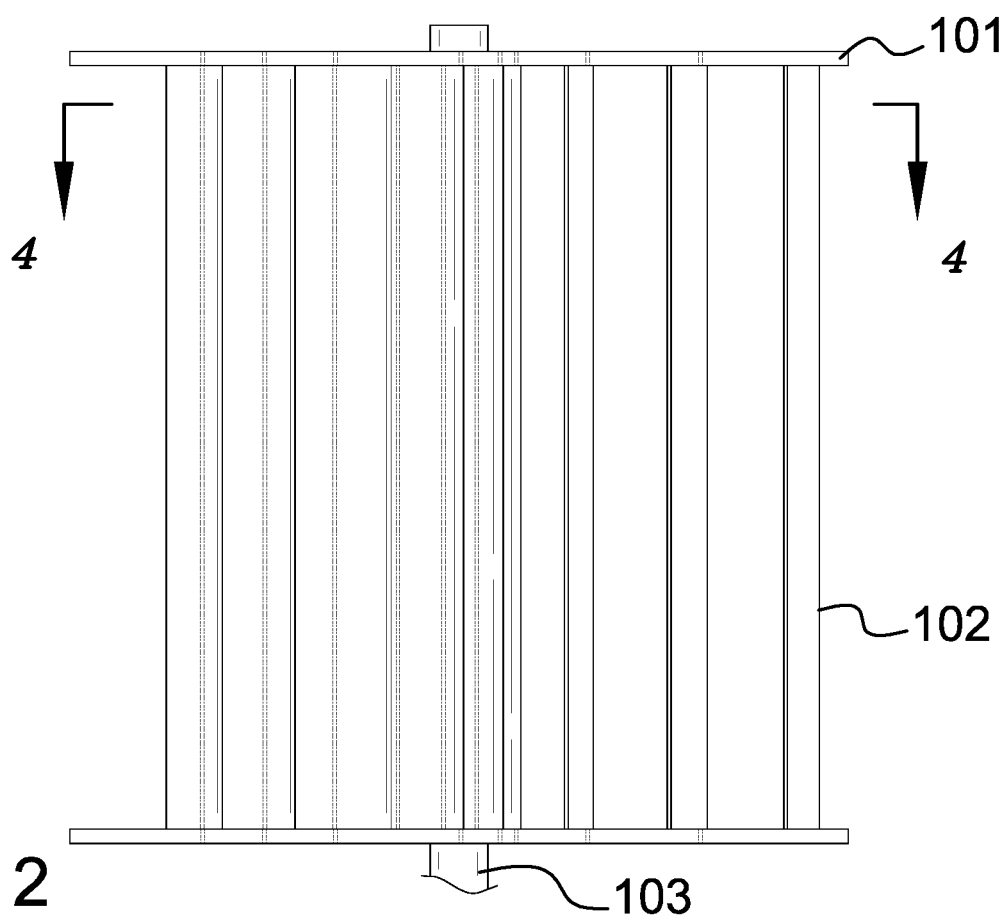
FIG. 2 is a front view of an embodiment of the disclosure.
Figure 3:
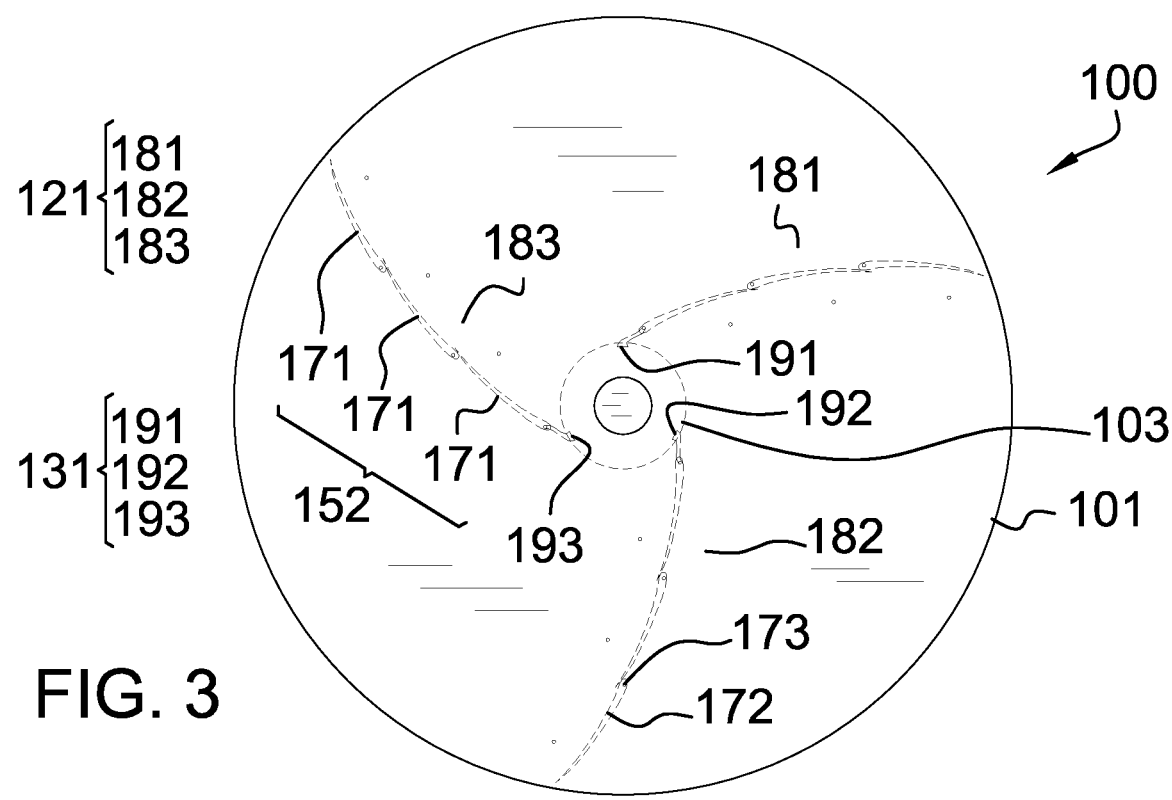
FIG. 3 is a top view of an embodiment of the disclosure.
Figure 4:
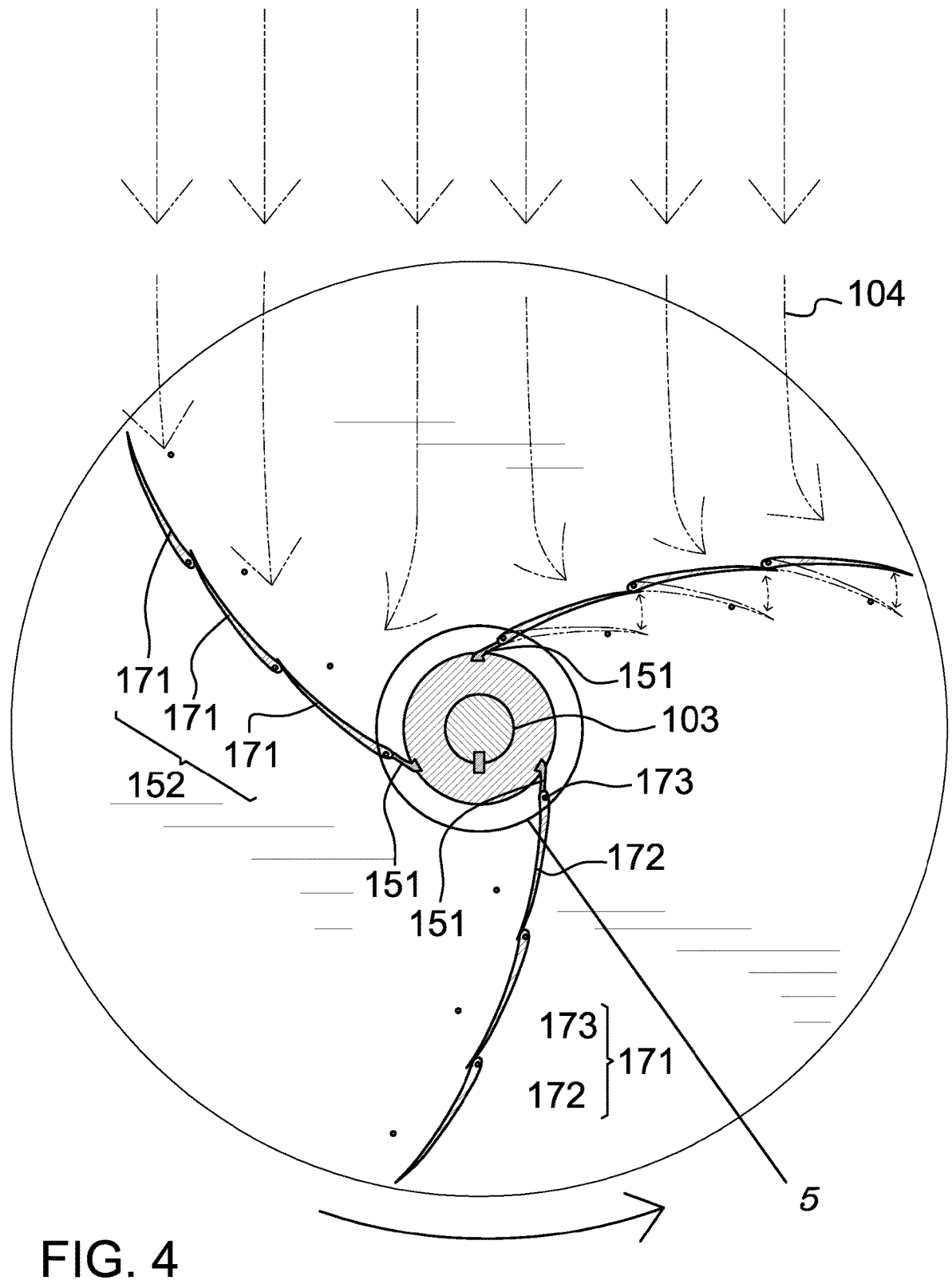
FIG. 4 is a cross-sectional view of an embodiment of the disclosure across 4-4 as shown in FIG. 2.
Figure 5:
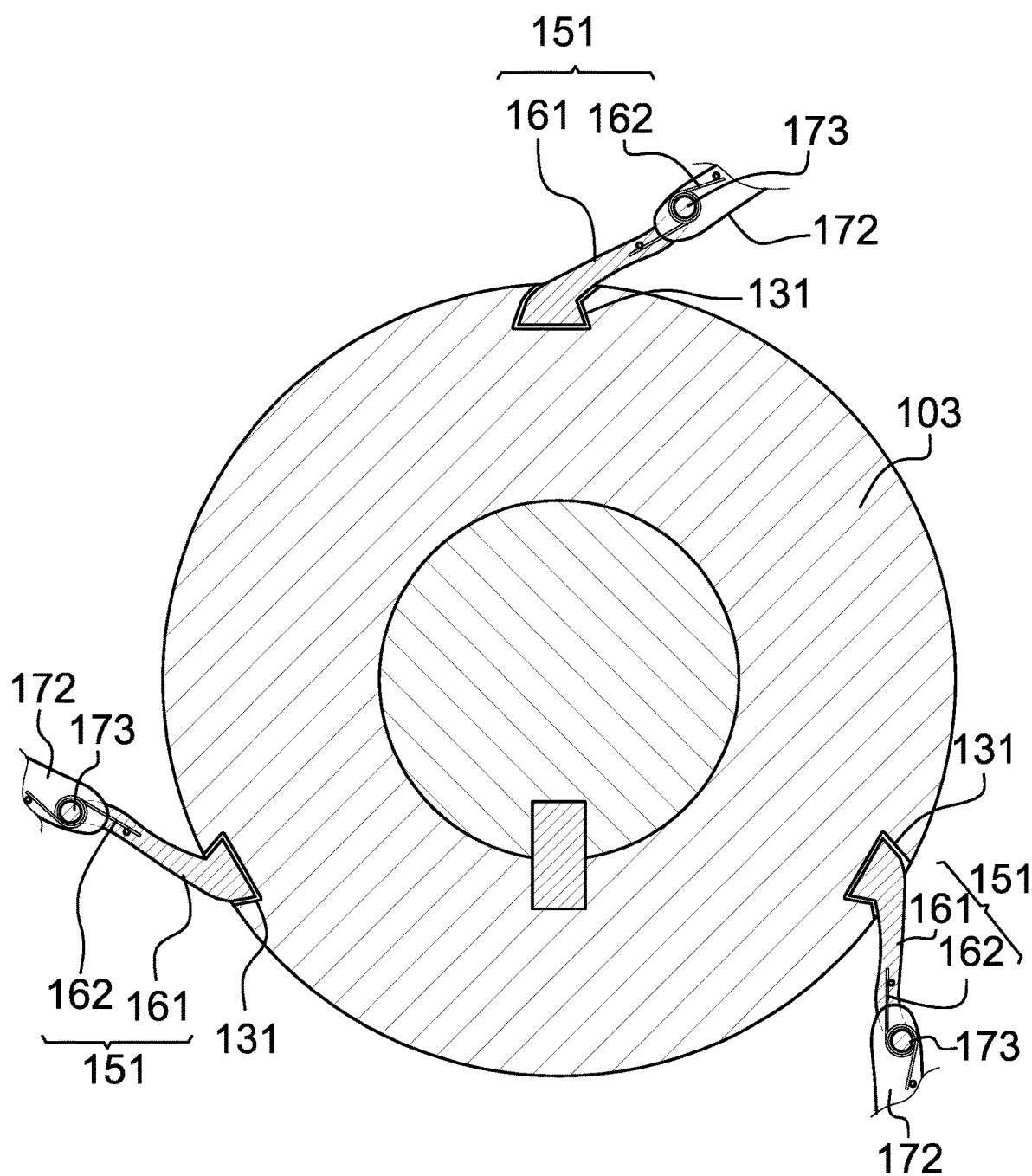
FIG. 5 is a detail view of an embodiment of the disclosure.
Figure 6:
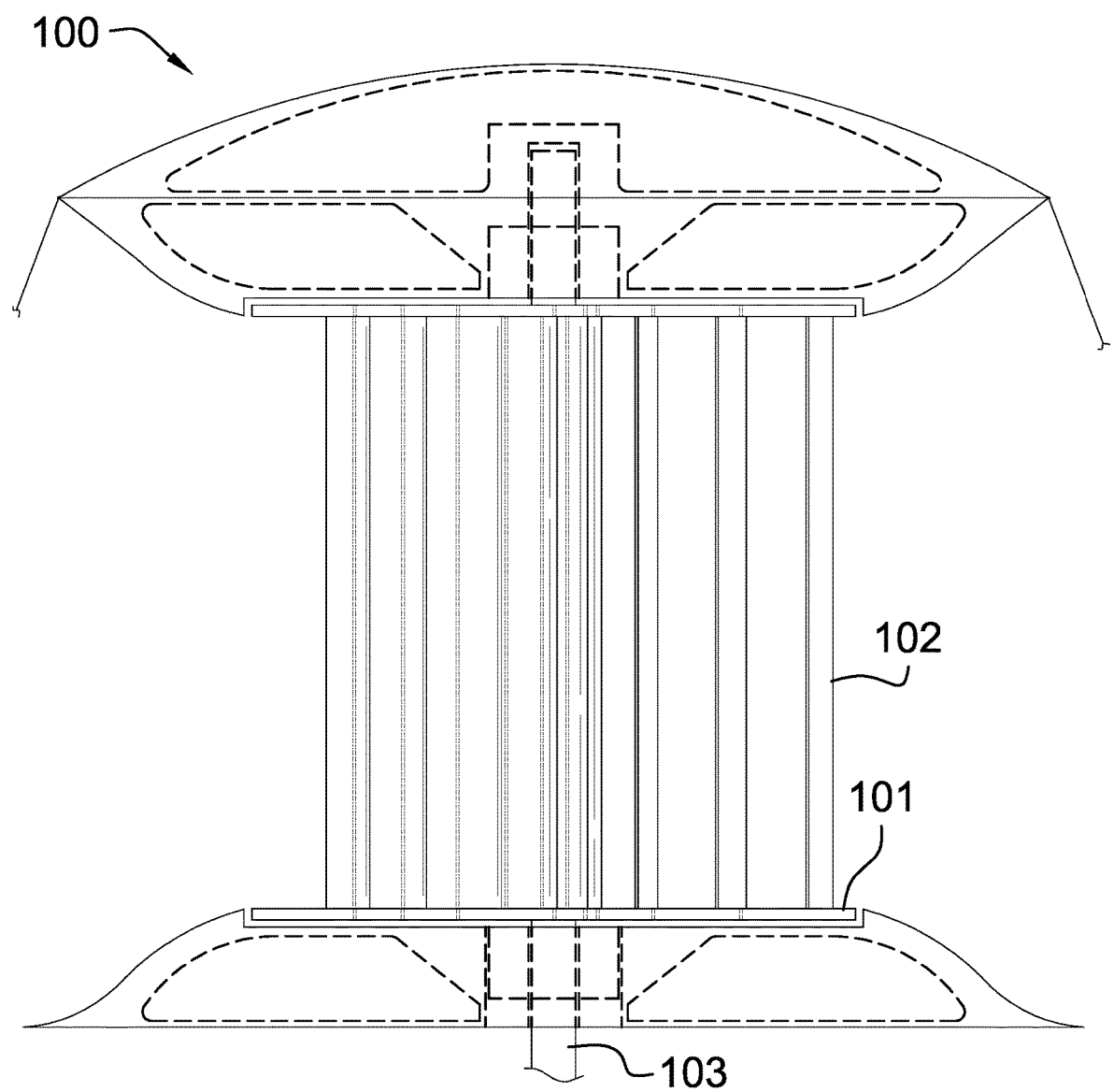
FIG. 6 is a detail view of an embodiment of the disclosure.

Detailed reference will now be made to one or more potential embodiments of the disclosure, which are illustrated in FIGS. 1 through 6.

The turbine 100 (hereinafter invention) is a turbine. The invention 100 converts the kinetic energy of the flowing fluid 104 into rotational energy that can be used to power a mechanical load. The flowing fluid is selected from the group consisting of: a) flowing atmospheric gas in the form of wind; and, b) flowing water. In the first potential embodiment of the disclosure, the mechanical load is selected from the group consisting of a mechanical load and a pump. The invention 100 comprises a plurality of plate structures 101, a plurality of sail/wing structures 102, and a drive shaft 103. The plurality of plate structures 101 attach to the plurality of sail/wing structures 102 such that the passage of the flowing fluid 104 through the plurality of sail/wing structures 102 rotates the combined structure. The combined structure formed by the plurality of plate structures 101 and the plurality of sail/wing structures 102 rotates around an axis of rotation. The drive shaft 103 attaches to the combined structure formed by the plurality of plate structures 101 and the plurality of sail/wing structures 102 such that the rotation of the combined structure rotates the drive shaft 103.

The drive shaft 103 is a prism-shaped structure. The drive shaft 103 is a rigid structure. The drive shaft 103 is a structure selected from the group consisting of a hollow structure and a solid structure. The drive shaft 103 attaches to the plurality of plate structures 101 and the plurality of sail/wing structures 102 such that the rotation of the plurality of plate structures 101 by the plurality of sail/wing structures 102 rotates the drive shaft 103. The axis of rotation generated by the plurality of sail/wing structures 102 and the plurality of plate structures 101 aligns with the center axis of the prism structure of the drive shaft 103. The drive shaft 103 attaches to the mechanical load such that the drive shaft 103 transfers the rotational energy generated by the invention 100 into the mechanical load. The drive shaft 103 forms an extension structure that extends the reach between the plurality of plate structures 101 and the plurality of sail/wing structures 102 and the mechanical load.

The drive shaft 103 further comprises a plurality of grooves 131. Each of the plurality of grooves 131 is a groove that is formed in the lateral face of the drive shaft 103. Each of the plurality of grooves 131 is located between the distal plate 141 and the proximal plate 142. Each of the plurality of grooves 131 receives the tongue structure 161 of the plurality of blade structures 152 of an individual sail/wing structure 121 to form a tongue and groove joint. Each of the plurality of grooves 131 secures its associated individual sail/wing structure 121 to the drive shaft 103.

Each of the plurality of plate structures 101 is a prism-shaped structure. Each of the plurality of plate structures 101 is formed as a disk. Each of the plurality of plate structures 101 attaches to the drive shaft 103 to form a composite prism structure. The plurality of plate structures 101 attaches the plurality of sail/wing structures 102 to the drive shaft 103. The plurality of plate structures 101 transfers the kinetic energy generated by the movement of the flowing fluid 104 past the plurality of sail/wing structures 102 into rotational energy that is transferred by the drive shaft 103 to a mechanical load. The plurality of plate structures 101 holds the plurality of sail/wing structures 102 in a fixed position relative to the plurality of plate structures 101. The plurality of plate structures 101 holds the plurality of sail/wing structures 102 in a fixed position relative to the drive shaft 103. The plurality of plate structures 101 comprises a distal plate 141 and a proximal plate 142.

The distal plate 141 is a prism-shaped structure. The distal plate 141 is formed as a disk. The distal plate 141 attaches to the congruent end of the prism structure of the drive shaft 103. The distal plate 141 attaches to the congruent end of the drive shaft 103 that is distal from the mechanical load. The distal plate 141 attaches to the drive shaft 103 to form a composite prism structure.

The proximal plate 142 is a prism-shaped structure. The proximal plate 142 is formed as a disk. The proximal plate 142 attaches to the lateral face of the prism structure of the drive shaft 103. The proximal plate 142 attaches to the drive shaft 103 to form a composite prism structure. The proximal plate 142 attaches to the drive shaft 103 such that the proximal plate 142 is located between the distal plate 141 and the mechanical load attached to the drive shaft 103.

Each of the plurality of sail/wing structures 102 is a mechanical structure. Each of the plurality of sail/wing structures 102 is selected from the group consisting of a sail, a wing, and a blade. The plurality of sail/wing structures 102 captures the kinetic energy necessary to rotate the plurality of plate structures 101 and the drive shaft 103. The plurality of sail/wing structures 102 comprises a collection of individual sail/wing structures 121.

Each individual sail/wing structure 121 selected from the plurality of sail/wing structures 102 presents an obstacle that diverts the passage of the flowing fluid 104 around the selected individual sail/wing structure 121. The diversion of the flowing fluid 104 around the selected individual sail/wing structure 121 draws kinetic energy from the flowing fluid 104 and transfers the drawn kinetic energy to the plurality of plate structures 101 and the drive shaft 103. Each individual sail/wing structure 121 selected from the plurality of sail/wing structures 102 is a rotating structure. The sail/wing shape generates a lift as the flowing fluid 104 flows around the individual sail/wing structure 121. The generated lift pulls the adjacent individual sail/wing structure 121 into the path of the flowing fluid 104 increasing the overall efficiency of the invention 100. Each individual sail/wing structure 121 rotates relative to the direction of the flowing fluid 104.

Each individual sail/wing structure 121 rotates such that the individual sail/wing structure 121 presents its maximum surface area to the flowing fluid 104 when the flowing fluid 104 is pushing the individual sail/wing structure 121 in the direction of the flowing fluid 104. Each individual sail/wing structure 121 rotates such that the individual sail/wing structure 121 presents its minimum surface area to the flowing fluid 104 when the flowing fluid 104 is pushing the individual sail/wing structure 121 in the direction opposite to the direction of the flowing fluid 104.

Each individual sail/wing structure 121 comprises a drive mount 151 and a plurality of blade structures 152.

The drive mount 151 is a prism-shaped structure. The drive mount 151 has an irregular prism shape. The drive mount 151 secures the individual sail/wing structure 121 to the drive shaft 103. The drive mount 151 inserts into a groove selected from the plurality of grooves 131 formed in the drive shaft 103. The drive mount 151 comprises a tongue structure 161 and a pivot shaft 173 mount 162.

The tongue structure 161 is a structure formed in the congruent ends of the prism structure of the drive mount 151. The tongue structure 161 is geometrically similar to one or more grooves selected from the plurality of grooves 131 of the drive shaft 103. The tongue structure 161 inserts into a groove selected from the plurality of grooves 131 such that the tongue structure 161 forms a tongue and groove joint with the drive shaft 103.

In a second potential embodiment of the disclosure, the drive mount 151 can be eliminated by placing the pivot shaft 173 close to the drive shaft 103 and mounting the blade 172 to the drive shaft 103 using the pivot shaft 173. In this scenario, one or more stop pins 174 mounted on the plurality of plate structures 101 will transfer the rotational energy generated by the flowing fluid 104 to the plurality of plate structures 101. Each of the one or more stop pins 174 is a post that mount in a congruent end selected from the group consisting of the distal plate 141 and the proximal plate 142. Each of the one or more stop pins 174 is positioned to limit the rotation of the blade 172 of an individual blade structure 171 while the individual blade structure 171 is subjected to the flowing fluid 104.

The pivot shaft 173 mount 162 is a mechanical structure. The pivot shaft 173 mount 162 attaches the pivot shaft 173 of an individual blade structure 171 selected from the plurality of blade structures 152 to the tongue structure 161. The pivot shaft 173 mount 162 receives the pivot shaft 173 of the individual blade structure 171 that is proximal to the drive mount 151.

Each of the plurality of blade structures 152 is a mechanical structure. Each of the plurality of blade structures 152 forms a portion of the structure of the individual sail/wing structure 121 that diverts the flowing fluid 104 around the individual sail/wing structure 121. Each of the plurality of blade structures 152 transfers the kinetic energy generated by the movement of the flowing fluid 104 past the individual sail/wing structure 121 into rotational energy that is transferred by the drive shaft 103 to a mechanical load. The Venturi effect generated by the individual sail/wing structure 121 will also help move the flowing fluid 104 between the individual blade structures 171.

Each of the plurality of blade structures 152 rotates relative to the direction of the flowing fluid 104. Each blade structure selected from the plurality of blade structures 152 rotates such that the selected blade structure presents its maximum surface area to the flowing fluid 104 when the flowing fluid 104 is pushing the selected blade structure flowing fluid 104 in the direction of the flowing fluid 104. Each blade structure selected from the plurality of blade structures 152 rotates such that the selected blade structure presents its minimum surface area to the plurality of blade structures 152 when the flowing fluid 104 is pushing the selected blade structure in the direction opposite to the direction of the flowing fluid 104.

The plurality of blade structures 152 comprises a collection of individual blade structures 171.

The individual blade structure 171 is a mechanical structure. The individual blade structure 171 is a rotating structure. The individual blade structure 171 forms a portion of the structure of the individual sail/wing structure 121 that diverts the flowing fluid 104 around the individual sail/wing structure 121. The individual blade structure 171 transfers the kinetic energy generated by the movement of the flowing fluid 104 past the individual sail/wing structure 121 into rotational energy that is transferred by the drive shaft 103 to a mechanical load. The individual blade structure 171 rotates relative to the direction of the flowing fluid 104.

The individual blade structure 171 rotates such that the individual blade structure 171 presents its maximum surface area to the flowing fluid 104 when the flowing fluid 104 is pushing the individual blade structure 171 in the direction of the flowing fluid 104. The individual blade structure 171 rotates such that the individual blade structure 171 presents its minimum surface area to the flowing fluid 104 when the flowing fluid 104 is pushing the individual blade structure 171 in the direction opposite to the direction of the flowing fluid 104.

The individual blade structure 171 comprises a blade 172 and a pivot shaft 173. The blade 172 is a mechanical structure. The blade 172 is defined elsewhere in this disclosure. The blade 172 forms the surface of the individual blade structure 171 that physically interacts with the individual blade structure 171. The pivot shaft 173 is a mechanical structure. The pivot shaft 173 attaches the blade 172 to the distal plate 141 and the proximal plate 142. The pivot shaft 173 attaches to the blade 172 such that the blade 172 rotates around the pivot shaft 173.

In the first potential embodiment of the disclosure, the plurality of sail/wing structures 102 further comprises a first sail/wing structure 181, a second sail/wing structure 182, and a third sail/wing structure 183. The plurality of grooves 131 further comprises a first groove 191, a second groove 192, and a third groove 193.

The first sail/wing structure 181 is a sail/wing structure selected from the plurality of sail/wing structures 102. The first groove 191 is a groove selected from the plurality of grooves 131 of the drive shaft 103. The tongue structure 161 of the first sail/wing structure 181 inserts into the first groove 191 to secure the first sail/wing structure 181 to the drive shaft 103.

The second sail/wing structure 182 is a sail/wing structure selected from the plurality of sail/wing structures 102. The second groove 192 is a groove selected from the plurality of grooves 131 of the drive shaft 103. The tongue structure 161 of the second sail/wing structure 182 inserts into the second groove 192 to secure the second sail/wing structure 182 to the drive shaft 103.

The third sail/wing structure 183 is a sail/wing structure selected from the plurality of sail/wing structures 102. The third groove 193 is a groove selected from the plurality of grooves 131 of the drive shaft 103. The tongue structure 161 of the third sail/wing structure 183 inserts into the third groove 193 to secure the third sail/wing structure 183 to the drive shaft 103.

The first sail/wing structure 181, the second sail/wing structure 182, and the third sail/wing structure 183 are positioned relative to each other such that: a) the cant formed between the first sail/wing structure 181 and the second sail/wing structure 182 equals the cant formed between the second sail/wing structure 182 and the third sail/wing structure 183; and, b) the cant formed between the second sail/wing structure 182 and the third sail/wing structure 183 equals the cant formed between the third sail/wing structure 183 and the first sail/wing structure 181.

The number of individual sail/wing structures 121 contained in the plurality of sail structures 102 can be increased.

In a third potential embodiment of the disclosure, the plurality of plate structures further comprises a bracing structure 175. The bracing structure 175 protects the invention 100 against damage from transient loads. The distal plate 141 further comprises a distal focus pan 143 and the proximal plate 142 further comprises a proximal focus pan 144. The distal focus pan 143 and the proximal focus pan 144 divert the flowing fluid into the plurality sail/wind structures 102. The distal plate 141 further comprises a weather cap 145 that protects the invention 100 from rain, snow, ice, and debris.

In a third potential embodiment of the disclosure, a plurality of guide wires 146 are used to brace the distal plate 141 to the proximal plate 142.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Blade: As used in this disclosure, a blade is a term that is used to describe a wide or broad surface of a structure.

Brace: As used in this disclosure, a brace is a structural element that is used to support, stabilize, or otherwise steady an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drive: As used in this disclosure, a drive is a mechanism or device that turns linear motion in to rotational motion or rotational motion into linear motion.

Extension Structure: As used in this disclosure, an extension structure is an inert physical structure that is used to extend or bridge the reach between any two objects.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Generator: In this disclosure, a generator is a machine that converts rotational mechanical energy into electric energy.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Rotation: As used in this disclosure, rotation refers to the cyclic movement of an object around a fixed point or fixed axis. The verb of rotation is to rotate.

Sail: As used in this disclosure, a sail refers to a mechanical structure that opposes the motion of the flowing fluid such that the sail converts the energy of the flowing fluid into a motive force or a rotational force. The term wing is a synonym for sail.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Tongue and Groove Joint: As used in this disclosure, a tongue and groove joint is a joint that is used to fasten a first plate or board to second plate or board. together. The groove portion of the tongue and groove joint is a groove that is formed in an edge of the first plate or board. The tongue portion of the tongue and groove joint is a ridge that is formed on the edge of the second plate or board. The tongue portion of the tongue and groove joint is sized and shaped such that the tongue portion of the tongue and groove joint can be inserted into the groove portion of the tongue and groove joint thus attaching the first plate or board to the second plate or board.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternative, a turbine can run in a reverse mode wherein externally provided rotational energy will be converted into kinetic energy that is expressed as the movement or compression of a fluid or gas.

Wind: As used in this disclosure, wind refers to the movement of atmospheric gases in a single direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A turbine comprising
a plurality of plate structures, a plurality of sail/wing structures, and a drive shaft;
wherein the plurality of plate structures attach to the plurality of sail/wing structures;
wherein the drive shaft attaches to a combined structure formed by the plurality of plate structures and the plurality of sail/wing structures;
wherein the turbine converts the kinetic energy of a flowing fluid into rotational energy that can be used to power a mechanical load;
wherein the plurality of plate structures attach to the plurality of sail/wing structures such that the passage of the flowing fluid through the plurality of sail/wing structures rotates the combined structure;
wherein the combined structure formed by the plurality of plate structures and the plurality of sail/wing structures rotates around an axis of rotation;
wherein the drive shaft further comprises a plurality of grooves;
wherein each of the plurality of grooves is a groove that is formed in a lateral face of the drive shaft;
wherein the plurality of grooves attach the plurality of sail/wing structures to the drive shaft.

2. The turbine according to claim 1
wherein the drive shaft attaches to the combined structure formed by the plurality of plate structures and the plurality of sail/wing structures such that the rotation of the combined structure rotates the drive shaft.

3. The turbine according to claim 2
wherein the drive shaft is a rigid structure;
wherein the axis of rotation generated by the plurality of sail/wing structures and the plurality of plate structures aligns with the center axis of the drive shaft.

4. The turbine according to claim 3
wherein each of the plurality of plate structures is formed as a disk;
wherein each of the plurality of plate structures attaches to the drive shaft to form a composite structure;
wherein the plurality of plate structures attaches the plurality of sail/wing structures to the drive shaft;
wherein the plurality of plate structures transfers the kinetic energy generated by the movement of the flowing fluid past the plurality of sail/wing structures into rotational energy that is transferred by the drive shaft to the mechanical load;

wherein the plurality of plate structures holds the plurality of sail/wing structures in a fixed position relative to the plurality of plate structures;

wherein the plurality of plate structures holds the plurality of sail/wing structures in a fixed position relative to the drive shaft.

5. The turbine according to claim 4
wherein each of the plurality of sail/wing structures is a mechanical structure;
wherein each of the plurality of sail/wing structures is a sail/wing;
wherein the plurality of sail/wing structures captures the kinetic energy necessary to rotate the plurality of plate structures and the drive shaft.

6. The turbine according to claim 5
wherein the plurality of plate structures comprises a distal plate and a proximal plate;
wherein the distal plate attaches to a congruent end of the drive shaft;
wherein the proximal plate attaches to the lateral face of the drive shaft.

7. The turbine according to claim 6 wherein the plurality of plate structures absorb kinetic energy from one or more stop pins and the pivot shaft mount.

8. The turbine according to claim 6
wherein the plurality of sail/wing structures comprises a collection of individual sail/wing structures;
wherein each individual sail/wing structure selected from the plurality of sail/wing structures presents an obstacle that diverts the passage of the flowing fluid around the selected individual sail/wing structure;
wherein the diversion of the flowing fluid around the selected individual sail/wing structure draws kinetic energy from the flowing fluid and transfers the drawn kinetic energy to the plurality of plate structures and the drive shaft;
wherein each individual sail/wing structure selected from the plurality of sail/wing structures is a rotating structure;
wherein each individual sail/wing structure rotates relative to the direction of the flowing fluid;
wherein each individual sail/wing structure rotates such that the individual sail/wing structure presents its maximum surface area to the flowing fluid when the flowing fluid is pushing the individual sail/wing structure in the direction of the flowing fluid;
wherein each individual sail/wing structure rotates such that the individual sail/wing structure presents its minimum surface area to the flowing fluid when the flowing fluid is pushing the individual sail/wing structure in the direction opposite to the direction of the flowing fluid creating a Venturi effect.

9. The turbine according to claim 8
wherein each individual sail/wing structure comprises a drive mount and a plurality of blade structures;
wherein the drive mount secures the individual sail/wing structure to the drive shaft;
wherein the drive mount has an irregular shape;
wherein the drive mount inserts into a groove selected from the plurality of grooves formed in the drive shaft;
wherein each of the plurality of blade structures is a mechanical structure;
wherein each of the plurality of blade structures forms a portion of the structure of the individual sail/wing structure that diverts the flowing fluid around the individual sail/wing structure.

10. The turbine according to claim 9
wherein the distal plate is formed as a disk;
wherein the distal plate attaches to the drive shaft to form a composite structure;
wherein the proximal plate is formed as a disk;
wherein the proximal plate attaches to the drive shaft to form a composite structure;
wherein the proximal plate attaches to the drive shaft such that the proximal plate is located between the distal plate and the mechanical load attached to the drive shaft.

11. The turbine according to claim 10
wherein the drive mount comprises a tongue structure and a pivot shaft mount;
wherein the tongue structure is a structure formed in the congruent ends of the drive mount;
wherein the tongue structure is geometrically similar to one or more grooves selected from the plurality of grooves of the drive shaft;
wherein the tongue structure inserts into a groove selected from the plurality of grooves such that the tongue structure forms a tongue and groove joint with the drive shaft;
wherein the pivot shaft mount is a mechanical structure;
wherein the pivot shaft mount attaches the pivot shaft of an individual blade structure selected from the plurality of blade structures to the tongue structure;
wherein the pivot shaft mount receives the pivot shaft of the individual blade structure that is proximal to the drive mount.

12. The turbine according to claim 11
wherein each of the plurality of blade structures transfers the kinetic energy generated by the movement of the flowing fluid past the individual sail/wing structure into rotational energy that is transferred by the drive shaft to an mechanical load;
wherein each of the plurality of blade structures rotates relative to the direction of the flowing fluid;
wherein each blade structure selected from the plurality of blade structures rotates such that the selected blade structure presents its maximum surface area to the flowing fluid when the flowing fluid is pushing the selected blade structure flowing fluid in the direction of the flowing fluid;
wherein each blade structure selected from the plurality of blade structures rotates such that the selected blade structure presents its minimum surface area to the plurality of blade structures when the flowing fluid is pushing the selected blade structure in the direction opposite to the direction of the flowing fluid.

13. The turbine according to claim 12
wherein the plurality of blade structures comprises a collection of individual blade structures;
wherein the individual blade structure is a mechanical structure;
wherein the individual blade structure is a rotating structure;
wherein the individual blade structure forms a portion of the structure of the individual sail/wing structure that diverts the flowing fluid around the individual sail/wing structure;
wherein the individual blade structure transfers the kinetic energy generated by the movement of the flowing fluid past the individual sail/wing structure into rotational energy that is transferred by the drive shaft to the mechanical load;

wherein the individual blade structure rotates relative to the direction of the flowing fluid;

wherein the individual blade structure rotates such that the individual blade structure presents its maximum surface area to the flowing fluid when the flowing fluid is pushing the individual blade structure in the direction of the flowing fluid;

wherein the individual blade structure rotates such that the individual blade structure presents its minimum surface area to the flowing fluid when the flowing fluid is pushing the individual blade structure in the direction opposite to the direction of the flowing fluid.

14. The turbine according to claim 13
wherein the individual blade structure comprises a blade and a pivot shaft;
wherein the blade is a mechanical structure;
wherein the blade forms the surface of the individual blade structure that physically interacts with the individual blade structure;
wherein the pivot shaft is a mechanical structure;
wherein the pivot shaft attaches the blade to the distal plate and the proximal plate;
wherein the pivot shaft attaches to the blade such that the blade rotates around the pivot shaft.

15. The turbine according to claim 14
wherein each of the plurality of grooves is located between the distal plate and the proximal plate;
wherein each of the plurality of grooves receives the tongue structure of the plurality of blade structures of an individual sail/wing structure to form a tongue and groove joint.

16. The turbine according to claim 15
wherein the plurality of plate structures further comprises a bracing structure;
wherein the bracing structure protects the turbine against damage from transient loads.

17. The turbine according to claim 16
wherein the distal plate further comprises a distal focus pan;
wherein the proximal plate further comprises a proximal focus pan;
wherein the distal focus pan diverts the flowing fluid into the plurality sail/wind structures;
wherein the proximal focus pan and the proximal focus pan diverts the flowing fluid into the plurality sail/wind structures;
wherein the distal plate further comprises a weather cap that protects the turbine.

18. The turbine according to claim 17 wherein a plurality of guide wires are used to brace the distal plate to the proximal plate.

* * * * *